United States Patent
Chang et al.

(10) Patent No.: US 12,523,964 B2
(45) Date of Patent: Jan. 13, 2026

(54) FULL COLOR HOLOGRAPHIC PROJECTOR WITH SINGLE WAVELENGTH LASER SOURCE, SPATIAL LIGHT MODULATOR, AND ROTATING DIFFUSER

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/642,017

(22) Filed: Apr. 22, 2024

(65) Prior Publication Data

US 2025/0328106 A1    Oct. 23, 2025

(51) Int. Cl.
G03H 1/00    (2006.01)
G03H 1/02    (2006.01)
G03H 1/22    (2006.01)

(52) U.S. Cl.
CPC ............ *G03H 1/2249* (2013.01); *G03H 1/02* (2013.01); *G03H 1/2294* (2013.01); *G03H 2001/0212* (2013.01); *G03H 2001/0224* (2013.01); *G03H 2001/2271* (2013.01); *G03H 2222/33* (2013.01); *G03H 2222/53* (2013.01); *G03H 2223/14* (2013.01)

(58) Field of Classification Search
None
See application file for complete search history.

(56) References Cited

U.S. PATENT DOCUMENTS

| | | | |
|---|---|---|---|
| 9,946,143 B1* | 4/2018 | Akiyama | G03B 21/208 |
| 2011/0251905 A1* | 10/2011 | Lawrence | G06Q 50/12 705/15 |
| 2012/0051044 A1* | 3/2012 | Akiyama | G03B 21/204 362/233 |
| 2013/0194644 A1* | 8/2013 | Cable | G03H 1/2294 359/9 |
| 2015/0381953 A1* | 12/2015 | Egawa | G02B 26/008 362/322 |
| 2016/0118265 A1* | 4/2016 | Goddard | H01L 21/76886 438/746 |
| 2016/0241821 A1* | 8/2016 | Kuroi | H04N 9/3111 |
| 2017/0195645 A1* | 7/2017 | Sakata | F21K 9/64 |

(Continued)

OTHER PUBLICATIONS

German Office Action from counterpart DE1020241145579, dated Dec. 19, 2024.

*Primary Examiner* — Zhihan Zhou

(57) ABSTRACT

A holographic projection system includes: a light source configured to generate a first light beam; a spatial light modulator configured to receive the first light beam and project a second light beam; a diffuser configured to rotate and including multiple regions, where two or more of the regions include respective down conversion materials, and where each of the respective down conversion materials convert a color of the second light beam to another color; and at least one control module configured to generate an image, encode the spatial light modulator with multiple holograms to generate the second light beam including instances of the image, and control rotation of the diffuser to display and overlay the instances of the image to provide a resultant image.

20 Claims, 6 Drawing Sheets

(56) References Cited

U.S. PATENT DOCUMENTS

| | | | | |
|---|---|---|---|---|
| 2017/0307969 | A1* | 10/2017 | Kawasumi | G03B 21/2073 |
| 2020/0310116 | A1* | 10/2020 | Konuma | G02B 30/50 |
| 2020/0333697 | A1* | 10/2020 | Tanaka | H04N 9/3105 |
| 2021/0026233 | A1* | 1/2021 | Takanashi | H04N 9/3105 |
| 2022/0390089 | A1* | 12/2022 | Li | G02B 26/0816 |
| 2024/0111209 | A1* | 4/2024 | Yasumatsu | G03B 21/208 |

* cited by examiner

FULL COLOR HOLOGRAPHIC PROJECTOR WITH SINGLE WAVELENGTH LASER SOURCE, SPATIAL LIGHT MODULATOR, AND ROTATING DIFFUSER

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to projection holographic display systems and head up display systems of vehicles.

Display devices are used in a variety of applications. Some example display devices are flat panel displays, projection displays, and head-up displays. Display devices can be either be of a transmission or reflection type.

A driver of a vehicle traditionally views surroundings of the vehicle through windows, windshields, and other glass of the vehicle. The driver may control vehicle acceleration, deceleration, and steering based on the driver's visual observation of the surroundings of the vehicle. The vehicle may include one or more displays that display various information to the driver. For example, some vehicles include an infotainment system that includes a display that displays various infotainment and other vehicle information. The vehicle may also include a head-up display (HUD) that displays information by forming a virtual image at a certain distance with reflection of a windshield. For example, the HUD may display a vehicle speed and other vehicle information (e.g., warnings such as lane departure warnings and collision avoidance warnings).

SUMMARY

A holographic projection system is disclosed and includes: a light source configured to generate a first light beam; a spatial light modulator configured to receive the first light beam and project a second light beam; a diffuser configured to rotate and including multiple regions, where two or more of the regions include respective down conversion materials, and where each of the respective down conversion materials convert a color of the second light beam to another color; and at least one control module configured to generate an image, encode the spatial light modulator with multiple holograms to generate the second light beam including instances of the image, and control rotation of the diffuser to display and overlay the instances of the image to provide a resultant image.

In other features, the control module is configured to rotate the diffuser at least three times a frame rate of the image such that the diffuser rotates once per refresh cycle of the image.

In other features, the image is displayed multiple times in multiple colors. The instances of the image are respectively in the colors.

In other features, the diffuser includes a first region that is transmissive to light of a first color. A second region converts light of the first color to a second color. A third region converts light of the first color to a third color.

In other features, the first color is blue. The second color is green. The third color is red.

In other features, the diffuser includes: a first region that does not include down conversion material; a second region that includes a first down conversion material; and a third region that includes a second down conversion material that is different than the first down conversion material.

In other features, the first down conversion material changes a wavelength of light of a first color to a second wavelength associated with light of a second color. The second down conversion material changes the wavelength of the light of the first color to a third wavelength associated with light of a third color.

In other features, the holographic projection system further includes beam expanding assembly configured to expand the first light beam prior to being received at the spatial light modulator.

In other features, the holographic projection system further includes a relay optics assembly configured to collimate light from the spatial light modulator to one of the regions of the diffuser.

In other features, the holographic projection system further includes a motor configured to rotate the diffuser, where the at least one control module is configured to control operation of the motor such that the second light beam is directed at each of the regions at different periods in time to display the instances of the image.

In other features, a holographic projection method is disclosed and includes: generating a first light beam via a light source; receiving the first light beam at a spatial light modulator and projecting a second light beam via the spatial light modulator; rotating a diffuser, where the diffuser includes regions, where two or more of the regions include respective down conversion materials, and where each of the respective down conversion materials convert a color of the second light beam to another color; generating an image; encoding the spatial light modulator with holograms to generate the second light beam including instances of the image; and controlling rotation of the diffuser to display and overlay the instances of the image to provide a resultant image.

In other features, the holographic projection method further includes: calculating the holograms; determining pulse widths for colors of the instances of the image being displayed; addressing the spatial light modulator with a first hologram for green emission and addressing the light source with a first pulse width determined for green emission; addressing the spatial light modulator with a second hologram for red emission and addressing the light source with a second pulse width determined for red emission; and addressing the spatial light modulator with a third hologram for blue emission and addressing the light source with a third pulse width determined for blue emission.

In other features, the holographic projection method further includes rotating the diffuser at least three times a frame rate of the image such that the diffuser rotates once per refresh cycle of the image.

In other features, the image is displayed multiple times in multiple colors. The instances of the image are respectively in the colors.

In other features, the diffuser includes a first region that is transmissive to light of a first color; a second region that converts light of the first color to a second color; and a third region that converts light of the first color to a third color.

In other features, the first color is blue, the second color is green, and the third color is red.

In other features, the diffuser includes: a first region that does not include down conversion material; a second region that includes a first down conversion material; and a third region that includes a second down conversion material that is different than the first down conversion material.

In other features, the first down conversion material changes a wavelength of light of a first color to a second wavelength associated with light of a second color. The second down conversion material changes the wavelength of the light of the first color to a third wavelength associated with light of a third color.

In other features, the holographic projection method further includes: expanding the first light beam prior to being received at the spatial light modulator; and collimating light from the spatial light modulator to one of the regions of the diffuser.

In other features, the holographic projection method further includes rotating the diffuser such that the second light beam is directed at each of the regions at different periods in time to display the instances of the image.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
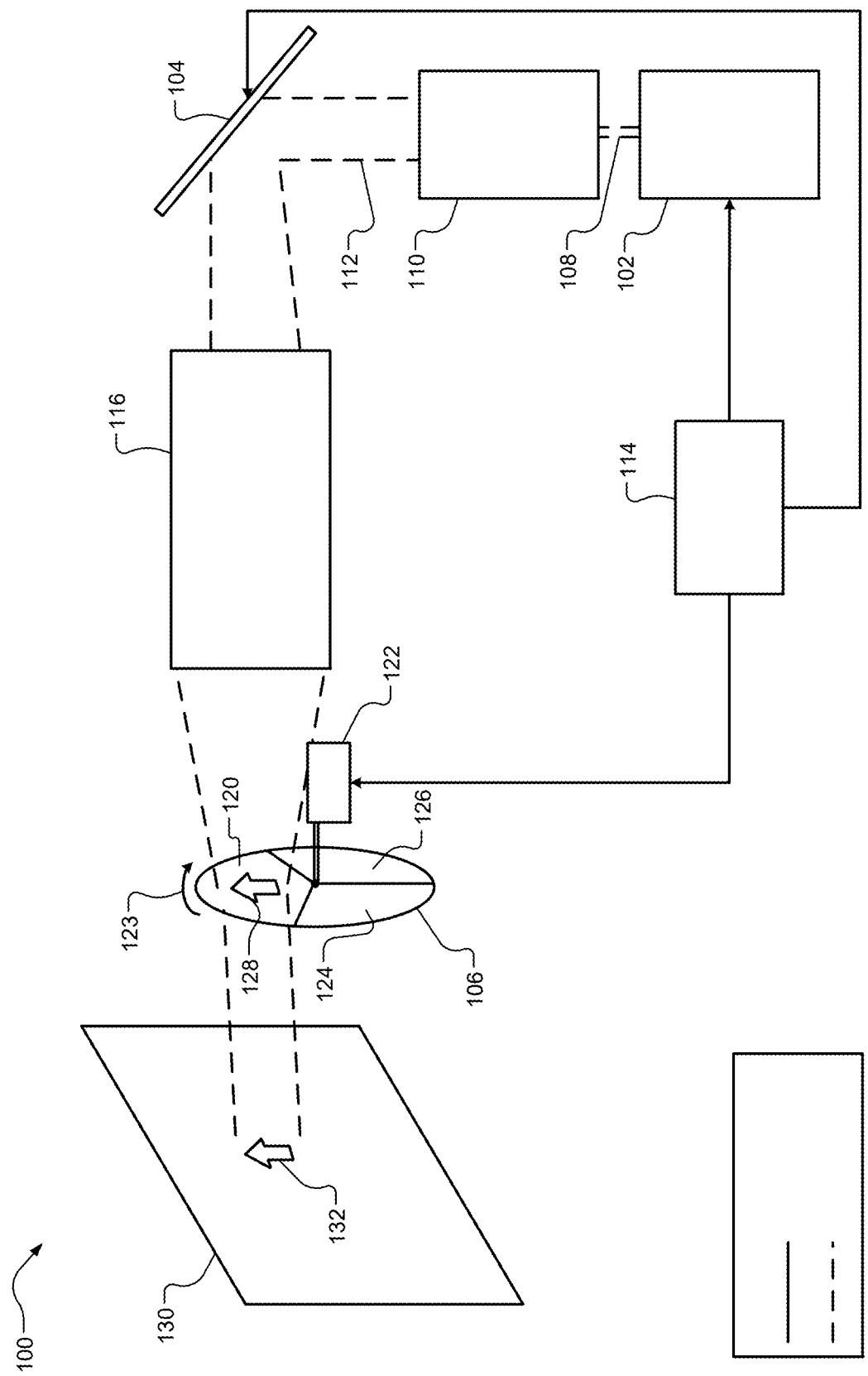
FIG. 1 is a functional block diagram of an example holographic projection system including a laser, a spatial light modulator (SLM), and a rotating diffuser in accordance with the present disclosure.

A vehicle may include a holographic HUD that includes a SLM and a coherent or partially coherent light source. The phase hologram is encoded on a SLM. Light from a coherent or partially coherent light source illuminates the SLM that is encoded with a phase hologram and the light is diffracted in a manner prescribed by the hologram. The diffracted light is reflected by a windshield of the vehicle and forms a real image on a driver's retina.

Holographic display systems often employ a source of coherent light, such as a laser, in conjunction with the other display components. Coherent light may refer to light that is spatially and temporally in-phase. When coherent light is reflected from a surface, various points on the surface are considered as a secondary light wave. When independent red, green and blue (RGB) channels are used, such as in a 3-LCOS holographic HUD, three spatially aligned RGB images are provided at an eye box. The eye box may refer to a rectangular planar area in which a viewer is able to see an image.

A holographic projection system (e.g., a holographic projection system of a multi-plane HUD) includes componentry to generate a holographic color projection. The componentry is costly and can include three color channels, where each color channel includes: a respective laser emitting a respectively colored light beam (e.g., red, green or blue light beam); a respective SLM for hologram projection at the color of the corresponding light source; and corresponding optical components for that color channel.

The examples set forth herein include utilizing a rotating diffuser having different regions with different down conversion materials. The rotating diffuser includes multiple regions (e.g., three regions), each of which emitting light at a respective wavelength. The wavelength of light emitted from each region is different than the wavelength of light emitted from each other region. The incorporation of the rotating diffuser allows for generation of three different colored light beams using a single laser and a single SLM instead of three lasers and three SLMs. As a result, the disclosed holographic projection systems have reduced SLM calibration complexity.

The disclosed embodiments include novel optical designs for achieving a full color holographic projector (or projection system) with a single light source and a single SLM. This is unlike a traditional projector that includes three lights sources and three SLMs. By reducing the number of components, the disclosed holographic projection systems are lighter in weight, cost less, and require less space. Each of the disclosed full color holographic projection systems may include a diffuser with regions having different down conversion material layers. The down conversion material layers may include phosphorescent layers, quantum dot layers, and/or other down conversion material layers. The down conversion materials are further described below. Sequential timing is implemented to drive a fast-switching SLM in correlation with rotation of the diffuser. The fast-switching SLM switches between multiple holograms for multiple colors to generate the instances of the image, which are overlaid to generate a resultant image seen by a viewer.

FIG. 1 shows a holographic projection system 100 including a laser 102, a SLM 104, and a rotating diffuser 106. The laser 102 generates a light beam 108 having a first wavelength. As an example, the laser 102 may be a single wavelength light source and generate a blue light beam having a wavelength of 445 nanometers (nm). Although a laser is shown, another type of light source may be used. The light beam 108 is directed to a beam expanding assembly 110, which may include beam expanding optics. An expanded beam 112 is directed from the beam expanding assembly 110 to the SLM 104. The beam expanding optics include lenses that expand the light beam 108 to provide a beam to illuminate and cover an active area of the SLM 104.

The SLM 104 is tuned for the color (e.g., blue) of the light generated by the laser 102. A display control module 114 encodes the SLM 104 with a hologram to display an image. The image may be the same in color as the light generated by the laser 102. The SLM 104 is tuned for a wavelength of the laser 102 and/or light beam 108. Relay optics of a relay optics assembly 116 are disposed between the SLM 104 and the diffuser 106. The relay optics collimate light from the SLM 104 and focus an image on a first region 120 of the diffuser 106.

The diffuser 106 is rotated, hence referred to as a rotating diffuser. The diffuser 106 is rotated by a motor 122 that is controlled by the display control module 114. The rotation of the diffuser 106 is indicated by arrow 123. The diffuser 106 includes at least three regions (or zones) including the first region 120, a second region 124 and a third region 126. At least two of the regions include and may be coated with a down conversion material layer. In the example shown, the front surface area of the diffuser 106 is divided into three equally sized regions and two of the three regions is coated with a respective down conversion material, such as phosphor, quantum dot, and/or other down conversion material. In an embodiment, one of the three regions is clear and/or not coated with a down conversion material and is transmissive to blue light. A second one of the regions is coated with a first down conversion material to permit passage of green light. A third one of the regions is coated with a second down conversion material to permit passage of red light. The down conversion materials may be coated in the regions, formed as layers across the regions, and/or may be incorporated into materials of the regions. The second and third regions may be substrates that are doped with down conversion material. The diffuser 106 scatters the received collimated light to emit non-collimated light. The diffuser 106 is highly efficiently transmissive.

In an embodiment, the SLM 104 is encoded with a hologram and displays a blue object 128 (e.g., a blue arrow) on one of the regions (e.g., the region 120) of the diffuser 106. The diffuser 106 is rotated at a high speed such that each of the regions 120, 124, 126 are aligned with the output of the relay optics assembly 116 at a rate of at least 30-60 times per second. Thus, the diffuser 106 is rotating at least at 30-60 revolutions per second. In an embodiment, blue light out of the relay optics assembly 116 is transmitted through the first region 120 to display the blue object, excites green phosphor of the down conversion material layer on the second region 124 to display the object in green, and exits red phosphor of the down conversion material layer on the third region 126 to display the object in red. The laser 102 may be ON or OFF when any of the regions 120, 124, 126 is aligned with the output of the relay optics assembly 216. As an example, if a yellow arrow image is to be generated, then the laser 102 may be OFF for region 120 and ON for regions 124 and 126, as a mixture of green and red light is yellow light.

The down conversion material of regions 124, 126 may be of respective types of phosphor that convert a receive light beam having light at a first wavelength (e.g., blue light with 445 nm wavelength) to a second light beam having light with a second wavelength (e.g., green light with 520 nm wavelength) and a third light beam having light with a third wavelength (e.g., red light with 627 nm wavelength). The image of the object can be displayed in any color, as any color can be generated with different combinations of RGB lighting. This may be implemented by adjusting when the laser is ON in relation to the rotated position of the diffuser 106, the holograms that the SLM 104 is addressed with for the regions 120, 124, 126, the luminance of light out of the relay optics assembly 116. etc. The luminance may be adjusted by adjusting pulse width of the light beam 108 out of the laser 102 and/or gray scale of graphic being displayed. The grayscale of the image being displayed may be adjusted by the display control module 114.

The image and/or object (e.g., the object 128) being displayed is projected from the diffuser 106 to a screen 130. The image and/or object being displayed on the screen is designated 132.

Figure 2:
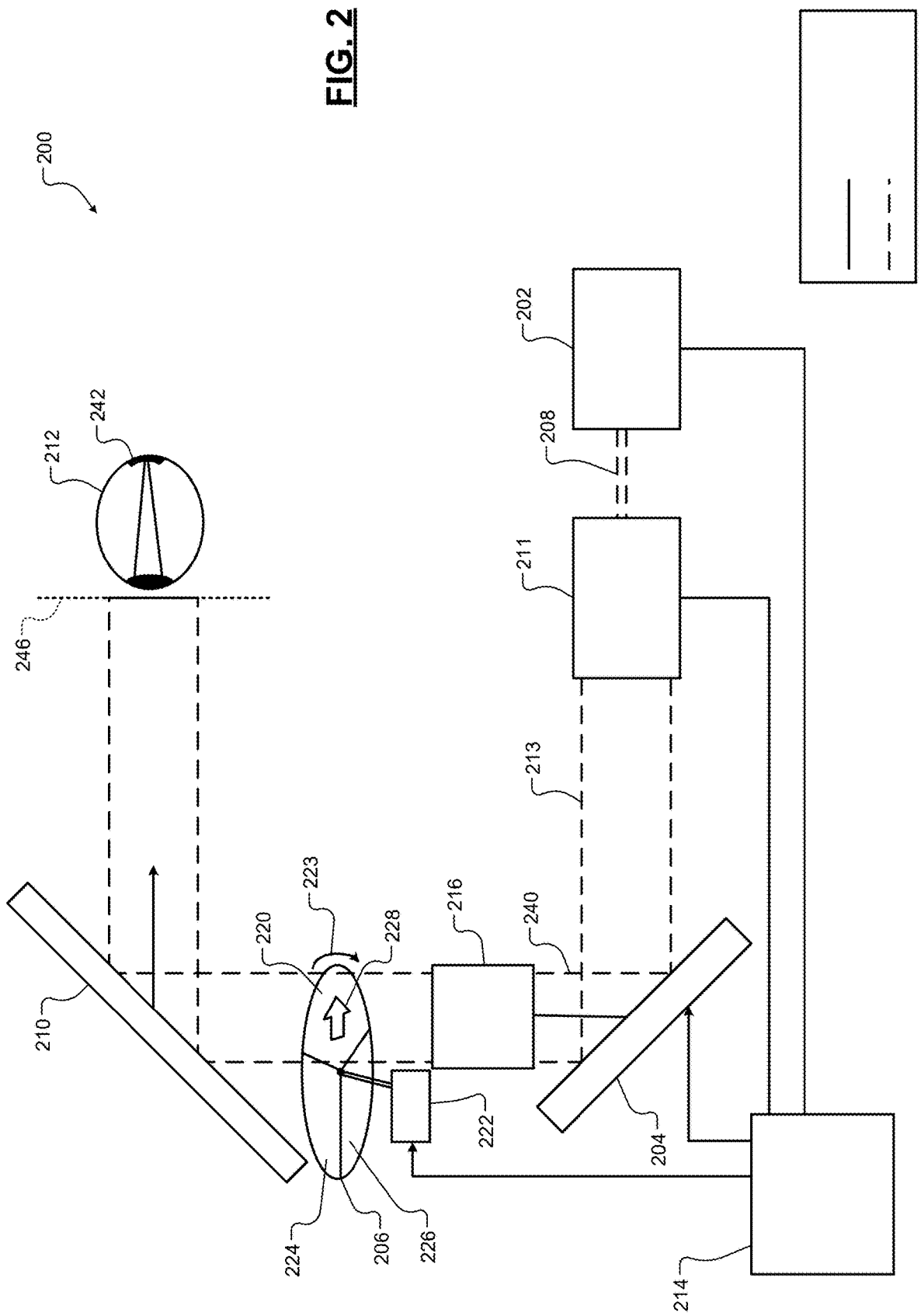
FIG. 2 is a functional block diagram of another example holographic projection system including a laser, a SLM, and a rotating diffuser in accordance with the present disclosure.

FIG. 2 shows a holographic projection system 200 including a laser 202, a spatial light modulator (SLM) 204, and a rotating diffuser 206. The holographic projection system 200 is similar to the holographic projection system 100 of FIG. 1, except that the image is reflected off a windshield or other reflector 210 and seen by a viewer's eyes (one eye 212 is shown).

The laser 202 generates a light beam 208 having a first wavelength. The light beam 208 is directed to a beam expanding assembly 211, which may include beam expanding optics. An expanded beam 213 is directed from the beam expanding assembly 211 to the SLM 204. The beam expanding optics include lenses that expand the light beam 208 to provide a beam to illuminate and cover an active area of the SLM 204.

The SLM 204 is tuned for the color (e.g., blue) of the light generated by the laser 202. A display control module 214 encodes the SLM 204 with a hologram to display an image. The image may be the same in color as the light generated by the laser 202. The SLM 204 is tuned for a wavelength of the laser 202 and/or light beam 108. Relay optics of a relay optics assembly 216 are disposed between the SLM 204 and the diffuser 206. The relay optics collimate light from the SLM 204 and focus an image on a first region 220 of the diffuser 206.

The diffuser 206 is rotated by a motor 222 that is controlled by the display control module 214. The rotation of the diffuser 206 is indicated by arrow 223. The diffuser 206 includes at least three regions including the first region 220, a second region 224 and a third region 226. At least two of the regions include and may be coated with a down conversion material layer such as any of the down conversion material referred to herein. The diffuser 206 scatters the received collimated light to emit non-collimated light.

In an embodiment, the SLM 204 is encoded with a hologram and displays a blue object 228 (e.g., a blue arrow) on one of the regions (e.g., the region 120) of the diffuser 206. The diffuser 206 is rotated at a high speed such that each of the regions 220, 224, 226 are aligned with the output of the relay optics assembly 116 at a rate of at least 30-60 times per second. Thus, the diffuser 206 is rotating at least at 30-60 revolutions per second. The laser 202 may be ON or OFF when any of the regions 220, 224, 226 is aligned with the output of the relay optics assembly 216.

The down conversion material of the regions 224, 226 may be of respective types of phosphor that convert a receive light beam having light at a first wavelength (e.g., blue light with 445 nm wavelength) to a second light beam having light with a second wavelength (e.g., green light with 520 nm wavelength) and a third light beam having light with a third wavelength (e.g., red light with 627 nm wavelength). The image of the object can be displayed in any color, as any color can be generated with different combinations of RGB lighting. This may be implemented by adjusting when the laser is ON in relation to the rotated position of the diffuser 206, the holograms that the SLM 204 is addressed with for the regions 220, 224, 226, the luminance of light out of the relay optics assembly 216. etc. The luminance may be adjusted by adjusting pulse width of the light beam 208 out of the laser 202 and/or gray scale of graphic being displayed. The grayscale of the image being displayed may be adjusted by the display control module 214.

The image and/or object (e.g., the object 228) being displayed is projected from the diffuser 206 to the reflector 210. In one embodiment, the reflector 210 is a windshield of a vehicle. In another embodiment, the reflector is a mirror. In another embodiment, multiple reflectors are disposed between the diffuser 206 and the viewer. In an embodiment, the multiple reflectors include one or more reflectors and a windshield. The one or more reflectors may include one or more mirrors. In another embodiment, no mirrors are included. The SLM 204 is encoded with a graphic hologram via the display control module 214 and provides a projected beam 240, which is directed through the relay optics assembly 216, and to the diffuser 206. Light emitted from the diffuser 206 is reflected off the reflector 210 and seen by a retina 242 of the viewer's eye 212. The display control module 214 may include display drivers for controlling states of the SLM 204. An example edge of an eye box 246 is shown. The eye box includes the range of locations of the eye 212, where the image can be seen by the viewer (or driver).

Figure 3:
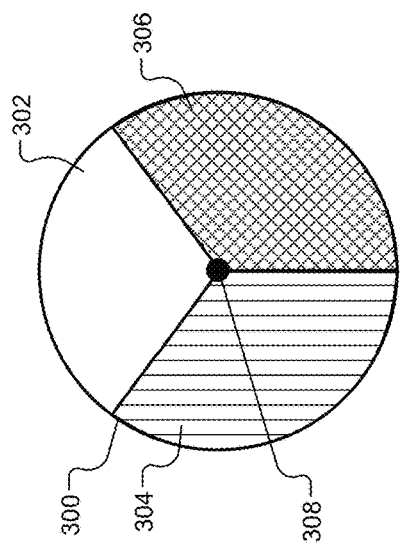
FIG. 3 is a front view of a rotating diffuser in accordance with the present disclosure.

FIG. 3 shows a rotating diffuser 300 equally divided into multiple regions. In the example shown, the diffuser 300 includes three regions 302, 304, 306. The region 302 is not coated with down-conversion material. The regions 304, 306 are coated with down-conversion material. The diffuser 300 includes a shaft 308, which may be connected to a shaft of a motor (e.g., one of the motors 122, 222 of FIGS. 1-2). The down-conversion material of region 304 is different than the down-conversion material of region 306. The down-conversion materials of regions 304, 306 may include different types of phosphor material (e.g., inorganic phosphors such as strontium, barium, calcium, europium, yttrium, etc.), different types of quantum dot material, etc. The down-conversion materials of regions 304 and 306 excite different color light.

Figure 4:
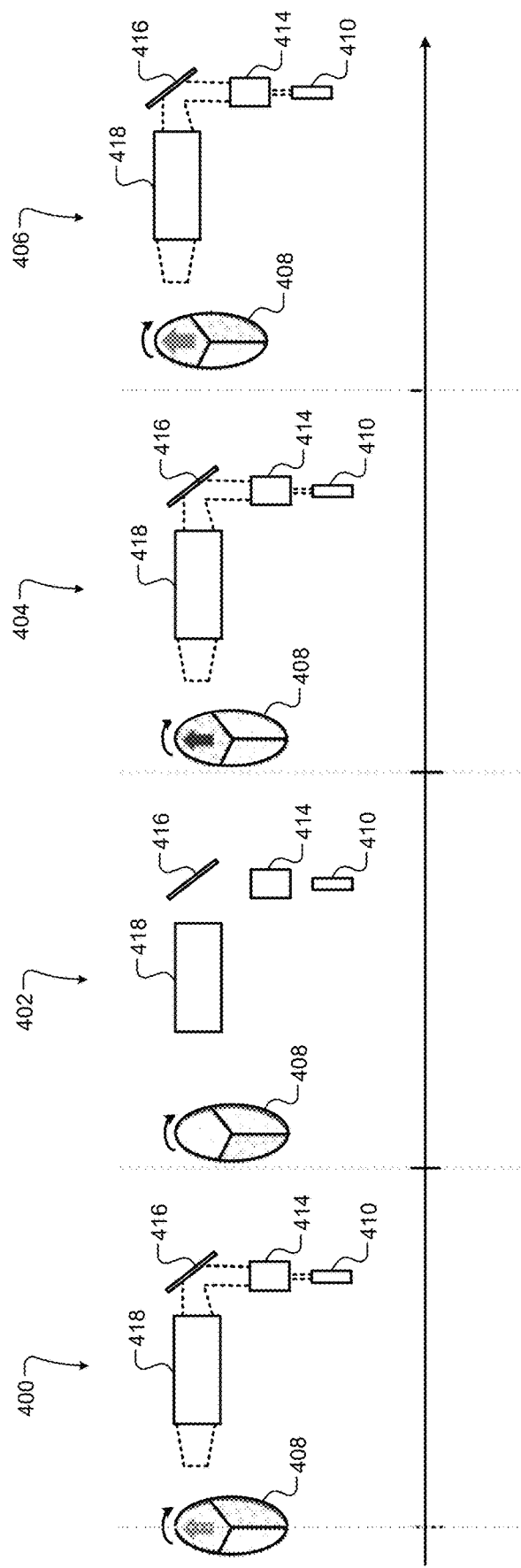
FIG. 4 is an example timing diagram illustrating laser timing and color emission for generating an example image in accordance with the present disclosure.

FIG. 4 shows a timing diagram illustrating laser timing and color emission for generating an example image. Four frames 400, 402, 404, 406 are shown with corresponding rotated positions of a diffuser 408 and states of a laser 410. In the example shown, an image of a yellow arrow is being displayed. To display a yellow arrow, a green arrow and a red arrow are displayed and overlap each other to create the yellow arrow. The holographic display projector switches from displaying no arrow, to displaying the green arrow, to displaying the red arrow and repeats this process at a high refresh rate such that the human eye only sees the yellow arrow.

During frames 400, 404, and 406, the laser 410 is on and is generating a light beam, which is directed through an expanding optic assembly 414 and directed at a SLM 416. The SLM 416 is encoded with a hologram to display an image of the object, which is projected via relay optics 418 to a region of the diffuser 408. Frame 400 is associated with displaying the arrow in a first color (e.g., green). In an embodiment, blue light from the laser 410 is directed to a first region of the diffuser 408 that is coated with a first down conversion material to display the arrow in the first color. Frame 402 is associated with not displaying anything (i.e., the laser 410 is OFF). The laser 410 is OFF and thus no light is generated and passed through the second region of the diffuser 408. Frame 404 is associated with displaying the arrow in a second color (e.g., red). In an embodiment, blue light from the laser 410 is directed to a third region of the diffuser 408 that is coated with a second down conversion material to display the arrow in the second color. Frame 406 is associated with again displaying the arrow in the first color (e.g., green), as described for frame 400. This provides a time sequential approach to displaying one or more objects in a selected color. If a display control module (e.g., one of the display control modules disclosed herein) sends a full color graphic at X Hertz (Hz), the SLM 416 and the rotating diffuser 408 are driven at 3X Hz for time sequential color generation, where X is a positive real number. Luminance of the image being displayed may be adjusted by changing a pulse width of the laser light beam generated and/or by adjusting the gray scale value of the graphic image at the display control module. The gray scale value may be an eight-bit value between 0-255.

Figure 5:
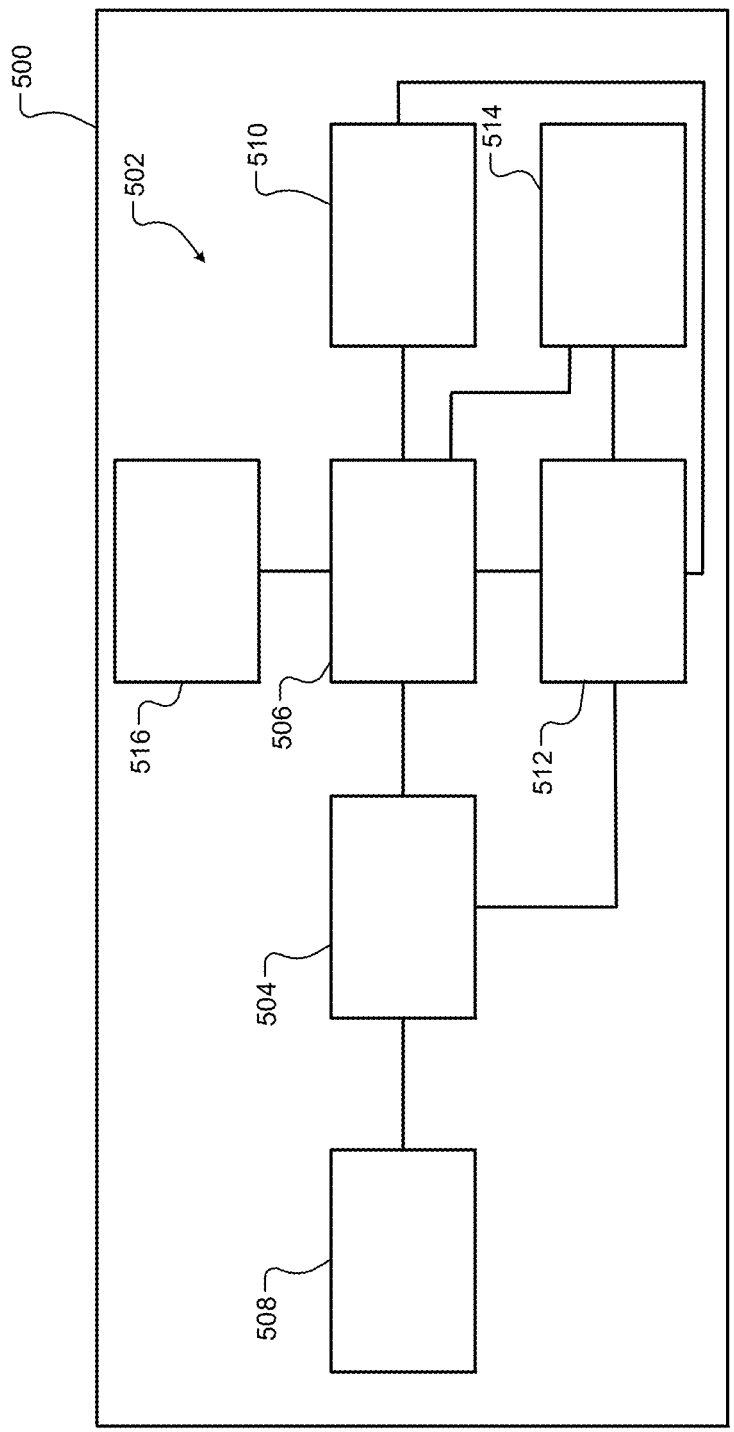
FIG. 5 is a functional block diagram of a vehicle including a holographic projection system in accordance with the present disclosure.

FIG. 5 shows a vehicle 500 including a holographic projection system 502. The holographic projection system 502 includes a vehicle control module 504, a display control module 506, sensors 508, a diffuser motor 510, a power source 512, a laser 514, and a SLM 516. The vehicle control module 504 may determine images to display, which are displayed via the display control module 506. The sensors 508 may include exterior object detection sensors and interior sensors such as cameras, radar sensors, lidar sensors, ultrasonic sensors, etc. The exterior sensors may detect vehicles, pedestrians, cyclists, buildings, etc. The interior sensors may be used to, for example, detect locations and gaze angles of viewer's eyes. The control modules 504, 506 may determine where to display an object, what display locations to color, what color to illuminate each display location, what luminescence level to set each display location, etc. These determinations are based on outputs of the sensors 508.

The power source 512 supplies power to the control modules 504, 506, the diffuser motor 510 and the laser 514. The display control module 506 controls operation of the diffuser motor 510 and the laser 514. The control modules 504, 506 may be implemented as a single module.

Figure 6:
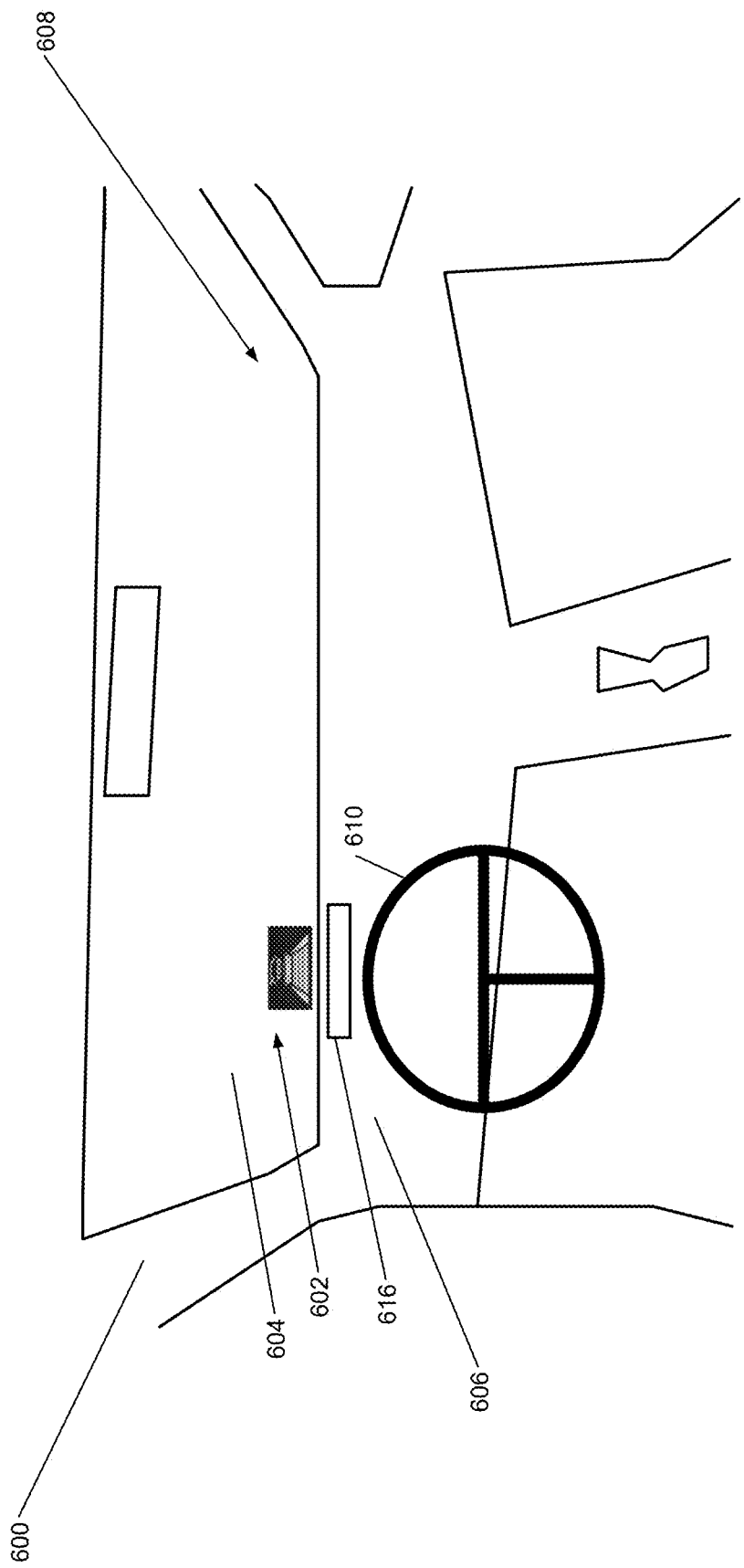
FIG. 6 is a perspective view of an example interior of a vehicle including a HUD.

FIG. 6 shows an example interior of a vehicle 600 including a HUD 602. The vehicle 600 includes a windshield 604 located in a front opening of the vehicle 600. Passengers within a passenger cabin 608 of the vehicle 600 can look through the windshield 604 to see in front of the vehicle 600. While the example of a land-based vehicle is described, the present application is also applicable to air-based vehicles (e.g., airplanes, helicopters, etc.) and water-based vehicles (e.g., boats, etc.). Also, although some examples are disclosed herein with respect to vehicle implementations, the examples are applicable to non-vehicle implementations. The windshield 604 is visually located above a dashboard 606 of the vehicle 600. The vehicle 600 may include a steering wheel 610. The vehicle 600 may be an autonomous vehicle, a semi-autonomous vehicle, or a non-autonomous vehicle.

A holographic projection system, such as that described above with respect to FIGS. 1-5, projects an image onto a portion of the windshield 604 through an aperture 616 in the dashboard 606. The image includes various vehicle information, such as a present speed of the vehicle 600, a present gear of a transmission of the vehicle 600, an engine speed, a directional heading of the vehicle 600, present infotainment system settings, and/or other vehicle information. The image presents data to the driver of the vehicle without the driver having to look away from objects in front of the vehicle. As discussed further below, the image includes different color overlapping images that are the same size and spatially aligned to provide a single image seen by the viewer as described herein.

Figure 7:
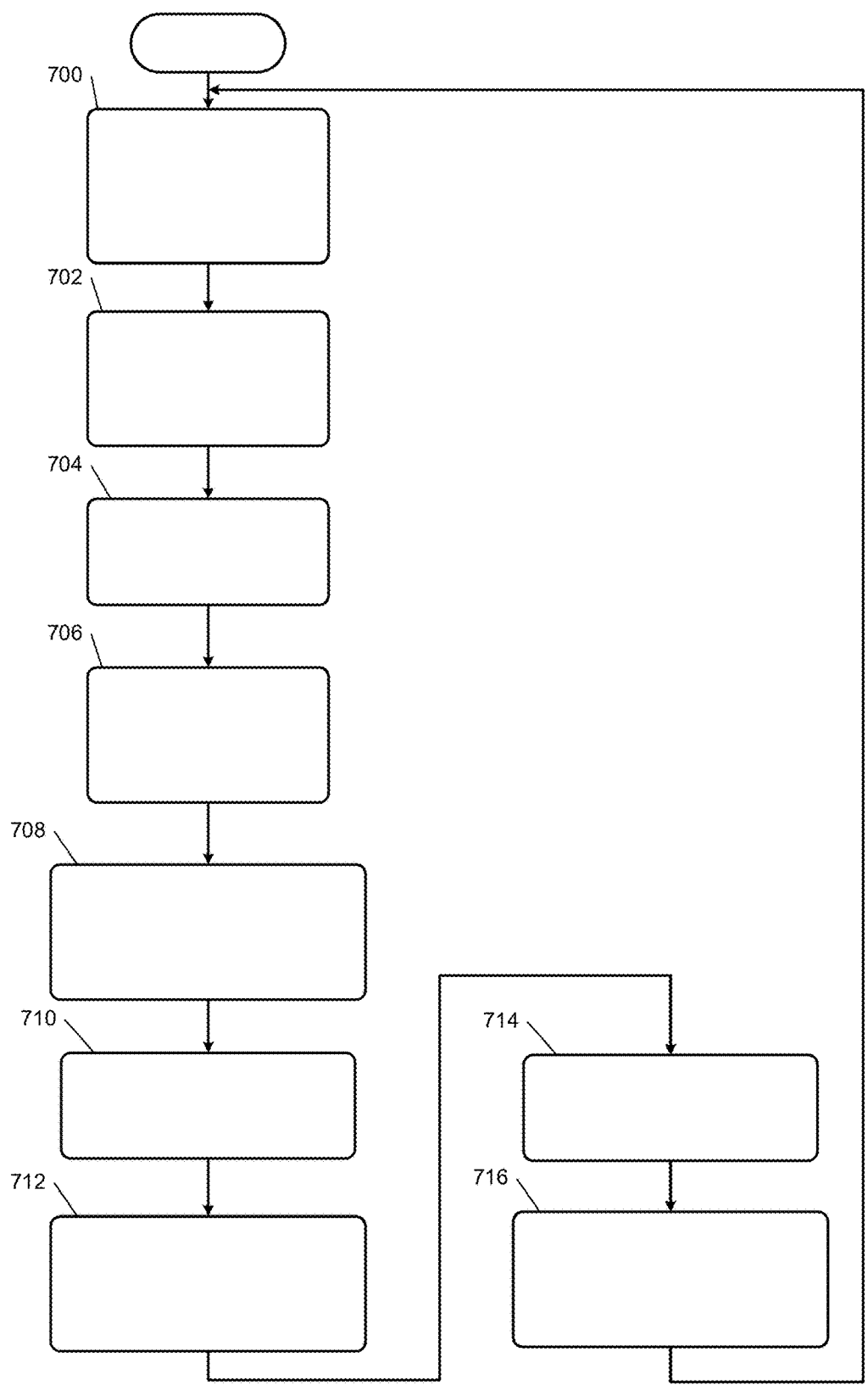
FIG. 7 illustrates an example holographic projection method in accordance with the present disclosure.

FIG. 7 shows a holographic projection method. The operations may be iteratively performed. At 700, a vehicle control module (e.g., the vehicle control module 504 of FIG. 5) generates and sends a full color frame including an image to a display control module (e.g., one of the display control modules 114, 214, 506 of FIGS. 1-2 and 5).

At 702, the display control module calculates holograms for instances of an image to be displayed. In an embodiment, this is done for three channels, which correspond to three different regions of a rotating diffuser, as described above.

At 704, the display control module determines a pulse width for each color of the instances being displayed. For example, the display control module determines a pulse width (or duty cycle) for each of three colors respectively of three instances being displayed to display a resultant image. The colors and instances have different pulse widths (or duty cycles). The image may be displayed in respective frames at each of the colors to provide the resultant image, as described above.

At 706, the display control module rotates a diffuser (e.g., one of the diffusers 106, 206, 300, 408 of FIGS. 1-4) to a first region with down conversion material for green emission. At 708, the display control module addresses a SLM (e.g., one of the SLMs 104, 204, 416 of FIGS. 1-2 and 4) with first hologram for green emission and addresses laser with pulse width determined for green emission.

At 710, the display control module rotates a diffuser to a second region with down conversion material for red emission. At 712, the display control module addresses a SLM with second hologram for green emission and addresses laser with pulse width determined for red emission.

At 714, the display control module rotates a diffuser to a third region with down conversion material for blue emission. At 716, the display control module addresses a SLM with third hologram for green emission and addresses laser with pulse width determined for blue emission.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events.

The examples disclosed herein include a full color holographic projector including only one light source generating a single light beam having light with a short wavelength (e.g., blue light having a wavelength of 445 nm). The full color holographic projector also includes only one SLM, relay optics, and a rotating diffuser coated with down conversion materials. The down conversion materials are excited by the light emitted by the single light source and emits light having visible wavelengths (e.g., red and green). The diffuser is coated with the down conversion materials and the SLM are driven at least three times a frame and/or refresh rate of a video source (e.g., a display control module). The full color holographic projector utilizes time-sequential hologram encoding of the SLM and time-sequential rotation of the diffuser for full color generation.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A holographic projection system comprising:
a light source configured to generate a first light beam;
a spatial light modulator configured to receive the first light beam and project a second light beam;
a diffuser configured to rotate and comprising a plurality of regions, wherein two or more of the plurality of regions comprise respective down conversion materials, and wherein each of the respective down conversion materials convert a color of the second light beam to another color; and
at least one control module configured to generate an image, encode the spatial light modulator with a plurality of different holograms for different respective colors of light emission to generate the second light beam including a plurality of instances of the image, adjust the plurality of different holograms respectively for the plurality of regions of the diffuser, and control rotation of the diffuser to display and overlay the plurality of instances of the image to provide, as a resultant, the image.

2. A holographic projection system comprising:
a light source configured to generate a first light beam;
a spatial light modulator configured to receive the first light beam and project a second light beam;
a diffuser configured to rotate and comprising a plurality of regions, wherein two or more of the plurality of regions comprise respective down conversion materials, and wherein each of the respective down conversion materials convert a color of the second light beam to another color; and
at least one control module configured to generate an image, encode the spatial light modulator with a plurality of holograms to generate the second light beam including a plurality of instances of the image, control rotation of the diffuser to display and overlay the plurality of instances of the image to provide, as a resultant, the image, and rotate the diffuser at least three times a frame rate of the image such that the diffuser rotates once per refresh cycle of the image.

3. The holographic projection system of claim 1, wherein:
the image is displayed a plurality of times in a plurality of colors; and
the plurality of instances of the image are respectively in the plurality of colors.

4. The holographic projection system of claim 1, wherein:
the diffuser comprises a first region that is transmissive to light of a first color;
a second region that converts light of the first color to a second color; and
a third region that converts light of the first color to a third color.

5. The holographic projection system of claim 3, wherein:
the first color is blue;
the second color is green; and
the third color is red.

6. The holographic projection system of claim 1, wherein the diffuser comprises:
a first region that does not include down conversion material;
a second region that includes a first down conversion material; and
a third region that includes a second down conversion material that is different than the first down conversion material.

7. The holographic projection system of claim 5, wherein:
the first down conversion material changes a wavelength of light of a first color to a second wavelength associated with light of a second color; and
the second down conversion material changes the wavelength of the light of the first color to a third wavelength associated with light of a third color.

8. The holographic projection system of claim 1, further comprising beam expanding assembly configured to expand the first light beam prior to being received at the spatial light modulator.

9. The holographic projection system of claim 1, further comprising a relay optics assembly configured to collimate light from the spatial light modulator to one of the plurality of regions of the diffuser.

10. The holographic projection system of claim 1, further comprising a motor configured to rotate the diffuser, wherein the at least one control module is configured to control operation of the motor such that the second light beam is directed at each of the plurality of regions at different periods in time to display the plurality of instances of the image.

11. A holographic projection method comprising:
generating a first light beam via a light source;
receiving the first light beam at a spatial light modulator and projecting a second light beam via the spatial light modulator;
rotating a diffuser, wherein the diffuser comprises a plurality of regions, wherein two or more of the plurality of regions comprise respective down conversion materials, and wherein each of the respective down conversion materials convert a color of the second light beam to another color;
generating an image;
encoding the spatial light modulator with a plurality of holograms for only one respective color of light to generate the second light beam including a plurality of instances of the image and address the light source with pulse widths respectively for different color light emissions associated with the plurality of regions of the diffuser, wherein the spatial light modulator is encoded with the plurality of holograms for only the one color of light concurrently with generation of the plurality of instances for the different color light emissions; and
controlling rotation of the diffuser to display and overlay the plurality of instances of the image to provide, as a resultant, the image.

12. The holographic projection method of claim 11, further comprising:
calculating the plurality of holograms;
determining the pulse widths for colors of the plurality of instances of the image being displayed;
addressing the spatial light modulator with a first hologram for green emission and addressing the light source with a first pulse width determined for green emission;
addressing the spatial light modulator with a second hologram for green emission and addressing the light source with a second pulse width determined for red emission; and
addressing the spatial light modulator with a third hologram for green emission and addressing the light source with a third pulse width determined for blue emission.

13. The holographic projection method of claim 11, further comprising rotating the diffuser at least three times a frame rate of the image such that the diffuser rotates once per refresh cycle of the image.

14. The holographic projection method of claim 11, wherein:
the image is displayed a plurality of times in a plurality of colors; and
the plurality of instances of the image are respectively in the plurality of colors.

15. The holographic projection method of claim 11, wherein:
the diffuser comprises a first region that is transmissive to light of a first color;
a second region that converts light of the first color to a second color; and
a third region that converts light of the first color to a third color.

16. The holographic projection method of claim 15, wherein:
the first color is blue;
the second color is green; and
the third color is red.

17. The holographic projection method of claim 11, wherein the diffuser comprises:
a first region that does not include down conversion material;
a second region that includes a first down conversion material; and
a third region that includes a second down conversion material that is different than the first down conversion material.

18. The holographic projection method of claim 17, wherein:
the first down conversion material changes a wavelength of light of a first color to a second wavelength associated with light of a second color; and
the second down conversion material changes the wavelength of the light of the first color to a third wavelength associated with light of a third color.

19. The holographic projection method of claim 11, further comprising:
expanding the first light beam prior to being received at the spatial light modulator; and
collimating light from the spatial light modulator to one of the plurality of regions of the diffuser.

20. The holographic projection method of claim 11, further comprising rotating the diffuser such that the second light beam is directed at each of the plurality of regions at different periods in time to display the plurality of instances of the image.

* * * * *